(12) United States Patent
Kato et al.

(10) Patent No.: US 7,482,075 B2
(45) Date of Patent: Jan. 27, 2009

(54) REFORMING APPARATUS FOR FUEL CELL, FUEL CELL AND OPERATION METHOD OF FUEL CELL

(75) Inventors: Toru Kato, Tsukuba (JP); Masatsugu Amano, Tsuchiura (JP); Ken Nozaki, Tsukuba (JP); Ken Kato, Tsukuba (JP); Akira Negishi, Matsudo (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 759 days.

(21) Appl. No.: 11/008,760

(22) Filed: Dec. 9, 2004

(65) Prior Publication Data

US 2005/0129995 A1 Jun. 16, 2005

(30) Foreign Application Priority Data

Dec. 10, 2003 (JP) ............................ 2003-412165

(51) Int. Cl.
*H01M 8/06* (2006.01)
*C01B 3/24* (2006.01)
(52) U.S. Cl. ............................ 429/17; 429/20; 423/650
(58) Field of Classification Search .................. 429/13, 429/17, 20; 423/650, 651
See application file for complete search history.

(56) References Cited

U.S. PATENT DOCUMENTS

| | | | |
|---|---|---|---|
| 5,616,430 A | 4/1997 | Aoyama ...................... 429/17 |
| 6,361,757 B1 * | 3/2002 | Shikada et al. .............. 423/651 |
| 6,376,423 B2 * | 4/2002 | Yagi et al. .................... 423/651 |
| 2002/0132155 A1 | 9/2002 | Shikada et al. ................ 429/40 |
| 2003/0175565 A1 | 9/2003 | Noda .......................... 429/21 |
| 2005/0106427 A1 * | 5/2005 | Murray et al. ................ 429/13 |

FOREIGN PATENT DOCUMENTS

| | | |
|---|---|---|
| JP | 8-69808 A | 3/1996 |
| JP | 10-189022 A | 7/1998 |
| JP | 11-106770 A | 4/1999 |
| JP | 2002-505511 | 2/2002 |
| JP | 2003-243000 A | 8/2003 |
| JP | 2004-344721 A | 12/2004 |
| WO | WO 99/44253 | 9/1999 |

OTHER PUBLICATIONS

"Trend in Research of Fuel for Fuel Cell", by Takeshi Nozaki, in "Development of Fuel Cell Vehicles and Related Materials," Chapter 3, p. 48, 1. 16-p. 52, 1.9 with partial translation, Dec. 2002.

* cited by examiner

*Primary Examiner*—Stephen J. Kalafut
(74) *Attorney, Agent, or Firm*—Young Basile (57) ABSTRACT

In a reforming method for a high temperature type fuel cell in which dimethyl ether is used as fuel gas, and a gas containing hydrogen and carbon monoxide produced by reacting dimethyl ether with carbon dioxide is fed into the anode, the carbon deposition at the time of reforming is prevented. The feeding amounts of dimethyl ether and carbon dioxide from a pipe h1 into the reforming reactor are regulated in such a way that the relation between temperature inside the reforming reactor and the molar ratio of carbon dioxide to dimethyl ether in the reforming reactor falls within the region C.

12 Claims, 5 Drawing Sheets

100# REFORMING APPARATUS FOR FUEL CELL, FUEL CELL AND OPERATION METHOD OF FUEL CELL

BACKGROUND OF THE INVENTION

1. Field of the Invention

The present invention relates to a reforming apparatus for fuel cells, a fuel cell and an operation method of the fuel cell.

2. Description of the Related Art

In a fuel cell system in which a relatively easily handled fuel such as natural gas and methanol is utilized, it is necessary to convert the fuel into a gas mainly composed of hydrogen (namely, the so-called "reforming" is conducted), and then feed the gas into an anode of the fuel cell body. As a method for performing this reforming, a method is in common use in which a fuel gas and steam are reacted with each other. This method requires a high purity steam, necessitating an apparatus for producing high purity water and an apparatus for producing steam, including utilities for these apparatuses.

Additionally, examples of the reforming method include a method in which a fuel gas is partially oxidized with air. This method has the advantage that the facility configuration is simpler than that for the steam reforming method and startup is instantaneous, but has the drawback that energy loss is high and contamination with nitrogen lowers the efficiency.

Additionally, a method is known in which a fuel gas and carbon dioxide are reacted with each other to generate hydrogen and carbon monoxide (namely, the so-called carbon dioxide reforming). However, in low temperature fuel cells (fuel cells for which the operation temperature is 230° C. or less) such as polymer electrolyte fuel cells, if the gas fed into the anode contains carbon monoxide, the platinum based electrode catalyst in the anode is deteriorated to inhibit the anode reaction of hydrogen, and it is therefore necessary to remove the carbon monoxide. Thus, the "carbon dioxide reforming" high in generation of carbon monoxide is not suitable as the reforming method for the low temperature fuel cells such as polymer electrolyte fuel cells.

On the contrary, in solid oxide fuel cells which are among high temperature fuel cells (fuel cells for which the operation temperature is 500° C. or more), carbon monoxide does not inhibit the anode reaction of hydrogen, but carbon monoxide itself carries out an anode reaction. Consequently, in the case of the solid oxide fuel cell, it is advantageous to adopt the "carbon dioxide reforming" which is high in the generation of carbon monoxide.

In these years, on the other hand, the use of dimethyl ether (hereinafter abbreviated as "DME") as fuel gas for fuel cells has been investigated. Dimethyl ether is a liquefied gas and hence has advantages that dimethyl ether has a high energy density (19.2 MJ/l), has little toxicity, is transferable in a condition of being contained in a steel cylinder, and is more easily reformed than propane, a similar liquefied gas, because of containing oxygen in the molecular structure thereof.

In view of the above described circumstances, for the purpose of actualizing a highly efficient, compact solid oxide fuel cell, it is probably suitable to conduct the carbon dioxide reforming by using dimethly ether as fuel gas; however, there is a problem of preventing the carbon deposition at the time of reforming.

Incidentally, the aforementioned reforming methods are described in "Trend in Research of Fuel for Fuel Cell," (in "Development of Fuel Cell Vehicles and Related Materials," Chapter 3), Ken Nozaki, C. M. C. Publishing Co., December, 2002. Additionally, JP2002-505511A (WO99/44253) describes the use of dimethyl ether as fuel gas for a polymer electrolyte fuel cell.

As described above, when steam reforming is conducted, peripheral equipment for the reforming apparatus or the fuel cell becomes complex and the startup time is longer. In the case of the partial oxidation, the efficiency is lowered. Additionally, nitrogen gas is used at the time of shutdown or emergency shutdown, and hence the peripheral equipment becomes complex. The present invention takes as its first object the solution of these issues, namely, the shortening of the startup time of the fuel cell, and the simplification of the peripheral equipment and control.

A second object of the present invention is the prevention of the carbon deposition in the reforming reactor or in the anode chamber in the case of the operation method of the fuel cell configured in such a way that the anode reaction of carbon monoxide as well as the anode reaction of hydrogen occurs, and either there is fed into the anode chamber a gas containing hydrogen and carbon monoxide generated by reacting dimethyl ether and carbon dioxide with each other in the reforming reactor, or there are fed into the anode chamber dimethyl ether and carbon dioxide without the intermediary of the reforming reactor.

SUMMARY OF THE INVENTION

For the purpose of achieving the first object, the present invention provides a reforming apparatus for fuel cells wherein dimethyl ether is reformed with carbon dioxide.

For the purpose of achieving the first object, the present invention provides a fuel cell wherein dimethyl ether is reformed with carbon dioxide.

It is preferable that the fuel cell of the present invention is configured in such a way that at the time of startup, carbon dioxide is fed from a carbon dioxide gas feeding unit into a reforming reactor or an anode chamber; and at the time of stationary operation, the discharged gas from the anode chamber or a mixed gas composed of the discharged gas and carbon dioxide from the carbon dioxide gas feeding unit is fed into the reforming reactor or the anode chamber. In this way, the consumption amount of the carbon dioxide from the carbon dioxide gas feeding unit can be reduced.

It is also preferable that the fuel cell of the present invention is configured in such a way that at the time of shutdown or emergency shutdown, carbon dioxide is introduced as purge gas from the carbon dioxide gas feeding unit into the reforming reactor and the anode chamber. In other words, when the carbon dioxide gas reforming is conducted, it is not necessary to provide a cylinder for a shutdown gas or the like (a gas feeding unit), in addition to the carbon dioxide gas feeding unit. Thus, the use of the carbon dioxide from the carbon dioxide gas feeding unit as purge gas can make the whole system simpler.

For the purpose of achieving the second object, the present invention provides an operation method of a fuel cell configured in such a way that the anode reaction of carbon monoxide as well as the anode reaction of hydrogen occurs, and either there is fed into the anode chamber a gas containing hydrogen and carbon monoxide generated by reacting dimethyl ether and carbon dioxide with each other in the reforming reactor, or there are fed into the anode chamber dimethyl ether and carbon dioxide without the intermediary of the reforming reactor, wherein the feeding amounts of dimethyl ether and carbon dioxide and the temperature of the reforming reactor or the temperature inside the anode chamber are set in such a way that the molar ratio (R) of carbon dioxide to dimethyl ether and the above described temperature (T) satisfy the following formula (1) or formula (2):

$$T \geq 644 + 305 \cdot \exp(-0.69R) \quad (1)$$

$$T \leq 597 - 194 \cdot \exp(-0.42R) \quad (2)$$

As a preferred mode of the present invention, a mode can be cited in which the fuel cell is a solid oxide fuel cell provided with a solid oxide as electrolyte. Incidentally, as an example in which the anode reaction of carbon monoxide as well as the anode reaction of hydrogen takes place, there can be cited a molten carbonate fuel cell provided with a molten carbonate as electrolyte, in addition to the solid oxide fuel cell.

In the operation method of the present invention, it is preferable that at the time of startup, carbon dioxide is fed from the carbon dioxide gas feeding unit into the reforming reactor or the anode chamber, and at the time of the stationary operation, the discharged gas from the anode chamber or a mixed gas composed of the discharged gas and carbon dioxide from the carbon dioxide gas feeding unit is fed into the reforming reactor or the anode chamber. In this way, the consumption amount of carbon dioxide from the carbon dioxide gas feeding unit can be reduced.

A fuel cell system operated according to the method of the present invention is provided with the carbon dioxide gas feeding unit for the purpose of subjecting dimethyl ether to carbon dioxide reforming, and hence the carbon dioxide can be introduced as purge gas, at the time of shutdown or emergency shutdown, from the carbon dioxide gas feeding unit into the reforming reactor and the anode chamber. In other words, when the carbon dioxide reforming is adopted, it is not necessary to provide a cylinder for a shutdown gas or the like (a gas feeding unit), in addition to the carbon dioxide gas feeding unit. Thus, the use of the carbon dioxide from the carbon dioxide gas feeding unit as purge gas can make the whole system simpler.

According to the reforming apparatus for fuel cell and the fuel cell of the present invention, owing to the reforming of dimethyl ether with carbon dioxide, there can be carried out shortening of the startup time of the fuel cell, simplification of the peripheral equipment related to reforming and shutdown, improvement of the response to load, and simplification of the control (control of the startup and control of the response to load).

According to the method of the present invention, the deposition of carbon in the reforming reactor or the anode chamber can be prevented, in the operation method of the fuel cell configured in such a way that the anode reaction of carbon monoxide as well as the anode reaction of hydrogen occurs, and either there is fed into the anode chamber a gas containing hydrogen and carbon monoxide generated by reacting dimethyl ether and carbon dioxide with each other in the reforming reactor, or there are fed into the anode chamber dimethyl ether and carbon dioxide without the intermediary of the reforming reactor.

DETAILED DESCRIPTION OF THE PREFERRED EMBODIMENT

Description will be made below on the embodiment of the present invention.

Figure 1:
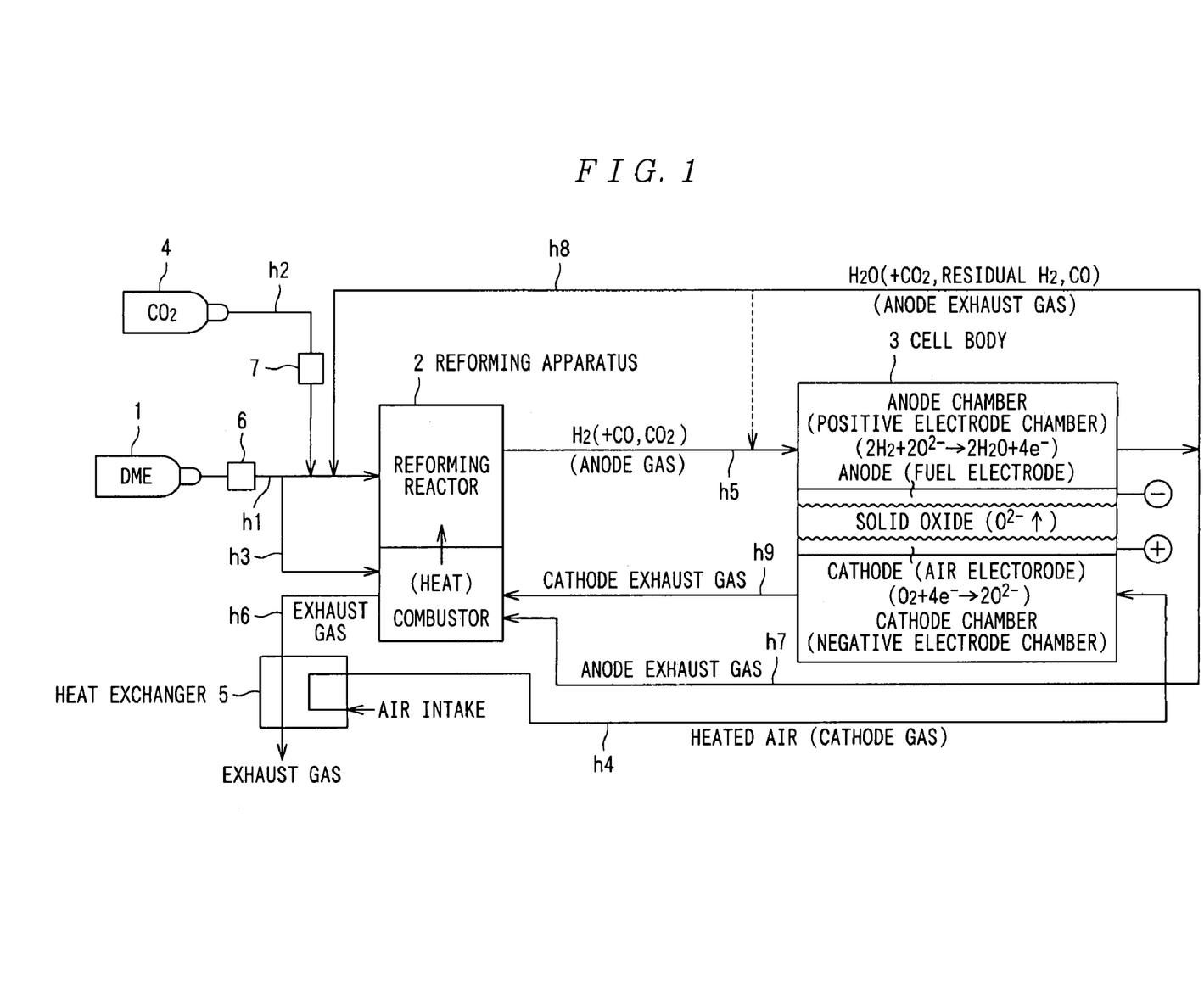
FIG. 1 is a schematic block diagram illustrating the fundamental configuration of the solid oxide fuel cell system of an embodiment.

FIG. 1 is a schematic block diagram illustrating the fundamental configuration of a solid oxide fuel cell system. This system includes a cylinder 1 containing dimethyl ether in the liquefied condition, a reforming apparatus 2, a cell body 3, a cylinder 4 containing carbon dioxide, and a heat exchanger 5. This system also include a pipe h1 for introducing dimethyl ether from the cylinder 1 into a reforming reactor of the reforming apparatus 2, a pipe h2 for introducing carbon dioxide from the cylinder 4 into the pipe h1, and a pipe h3 for introducing dimethyl ether in the cylinder 1 into a combustor of the reforming apparatus 2. The pipe h3 branches from the pipe h1 at a position upstream of the position connected to the pipe h2, and reaches the combustor.

Additionally, the system includes a pipe h4 for introducing heated air (the cathode gas) into a cathode chamber of the cell body 3, a pipe h5 for introducing the anode gas into an anode chamber of the cell body 3, and a pipe h6 for passing the exhaust gas from the combustor of the reforming apparatus 2. The heat exchanger 5 is arranged at the air intake opening of the pipe h4, and uses as the heat source the heat of the exhaust gas introduced into the pipe h6.

The system further includes a pipe h7 for introducing the exhaust gas (the anode exhaust gas) discharged from the anode chamber of the cell body 3 into the combustor of the reforming apparatus 2, a pipe h8 for delivering the exhaust gas to the reforming reactor of the reforming apparatus 2, and a pipe h9 for introducing the exhaust gas (the cathode exhaust gas) discharged from the cathode chamber of the cell body 3 into the combustor of the reforming apparatus 2.

Additionally, the system includes a flow rate regulator 6 for regulating the amount of the gas (dimethyl ether) to be introduced from the cylinder 1 into the pipe h1, and a flow rate regulator 7 for regulating the amount of the gas (carbon dioxide) to be introduced from the pipe h2 connected to the cylinder 4 into the pipe h1.

In the present embodiment, the temperature inside the reforming reactor is set at 750° C., and the feeding amount of dimethyl ether and the feeding amount of carbon dioxide from the pipe h1 into the interior of the reforming reactor are regulated in such a way that the molar ratio of carbon dioxide to dimethyl ether in the reforming reactor is 2.0. Because the pipe h2 and the pipe h8 are connected to the pipe h1, the amount of carbon dioxide in the anode exhaust gas to be introduced from the pipe h8 into the reforming reactor is measured, and in compliance with this measured value, the flow rate of carbon dioxide to be delivered from the cylinder 4 to the pipe h1 is regulated by means of the flow rate regulator 7. Additionally, the flow rate of dimethyl ether in the pipe h1 is regulated by means of the flow rate regulator 6. In this way, the carbon deposition in the interior of the reforming reactor can be prevented.

Additionally, at the time of shutdown or emergency shutdown, carbon dioxide can be introduced as purge gas from the cylinder 4 into the reforming reactor and the anode chamber. In other words, it is not necessary to provide another cylinder for purge gas. On the contrary, in the case of the steam reforming, it is necessary to provide a cylinder for nitrogen gas or the like as a cylinder for a shutdown gas.

EXAMPLES

By use of a test cell in which a solid oxide fuel cell is formed in a cylindrical shape, there was carried out a test for investigating the cell performance and the condition of carbon deposition. This test was carried out by use of an experimental apparatus illustrated in FIG. 2. This experimental apparatus includes cylinders containing respectively different gases to be introduced into the test cell 8; pipes, valves and mass flow controllers (MFCs) for feeding the different gases into the test cell 8 with the respective predetermined flow rates; and a Fourier transform infrared spectrometer (FT-IR) and a quadripole mass spectrometer (QMS) to be used as analysis apparatuses for analyzing the exhaust gases generated by the cell reaction.

Figure 3:
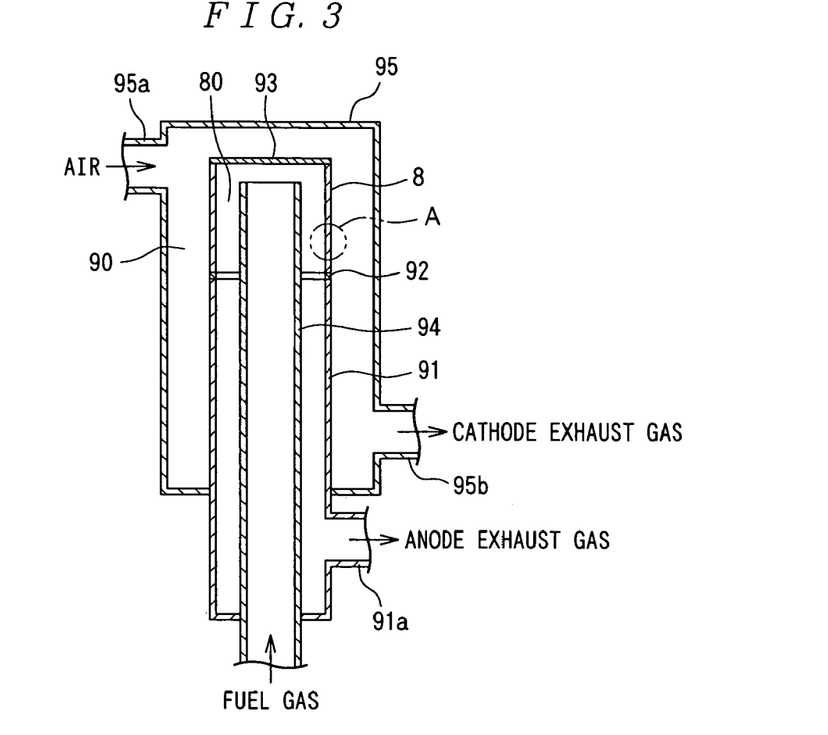
FIG. 3 is an enlarged sectional view of the test cell shown in FIG. 2 and the portion around the cell.
Figure 4:
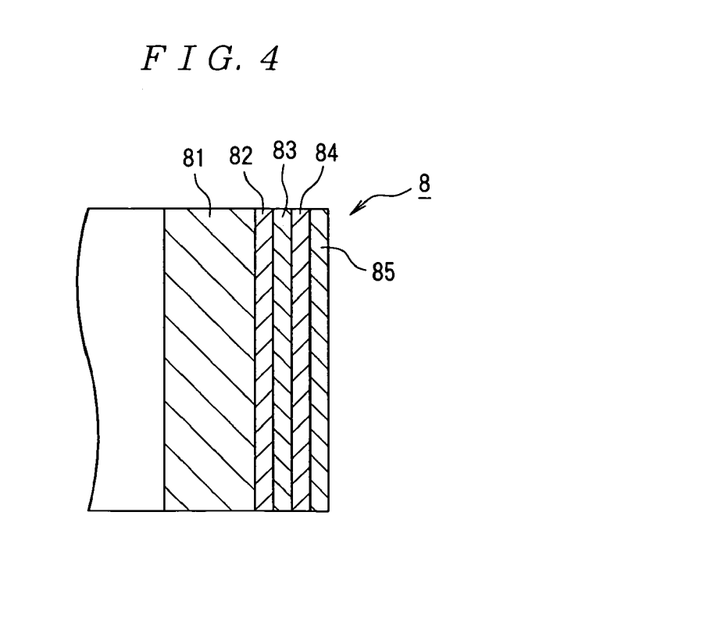
FIG. 4 is an enlarged diagram of the portion A in FIG. 3.

With reference to FIGS. 3 and 4, detailed description will be made on the test cell 8. FIG. 3 is an enlarged view of the test cell 8 shown in FIG. 2 and the portion around the cell, and FIG. 4 is an enlarged diagram of the portion A in FIG. 3.

As shown in FIG. 3, the cylindrical test cell 8 is fixed to the upper portion of a cylinder 91 having the same outside diameter as that of the test cell 8 with the aid of a glass joint 92. In the lower portion of the cylinder 91, an exhaust pipe 91a is provided. The upper portion of the test cell 8 is closed with a glass lid 93 through thermal fusion bonding. In the interior of the cylinder integrating the test cell 8 and the cylinder 91, a pipe 94 for introducing fuel gas is arranged. The pipe 94 is arranged in such a way that the upper end thereof reaches the upper portion of the test cell 8. A space 80 enclosed by the pipe 94 for introducing fuel gas and the test cell 8 makes the anode chamber.

Additionally, the portion of the cylinder higher than the exhaust pipe 91a is enclosed with a cylindrical case 95. An air intake pipe 95a is arranged on the upper end portion of the circumferential surface of the cylinder forming this cylindrical case 95, and an exhaust pipe 95b is arranged on the lower end portion of the surface. A space 90 enclosed by the case 95 and the test cell 8 makes the cathode chamber.

As shown in FIG. 4, the test cell 8 is composed of a support pipe 81, and an anode 82, an electrolyte layer 83, an intermediate layer 84 and a cathode 85 formed in layers around the support pipe 81.

Firstly, a nickel oxide (NiO) particle material and a YSZ (Yttria Stabilized Zirconia) particle material, both for use in forming the support pipe 81, were mixed together in a weight ratio of NiO:YSZ=60:40; the mixture thus obtained was added with an organic solvent and a binder ingredient to yield a slurry; the slurry thus obtained was molded into a sheet of 500 µm in thickness and then the sheet was dried; thereafter the dried sheet was molded into a cylinder, and the cylinder was dried. Thus, a cylindrical molded body to be the support pipe 81 was obtained.

Next, a slurry for use in forming the anode 82 was prepared by use of a nickel oxide particle material and a YSZ particle material, both materials being smaller in particle size than the particle materials for use in forming the support pipe 81. Additionally, a slurry for use in forming the electrolyte layer 83 was prepared by mixing together an SSZ (Scandia Stabilized Zirconia: $(Sc_2O_3)_{0.1}(ZrO_2)_{0.9}$) particle material, an organic solvent and a binder ingredient.

Then, the slurry for use in forming the anode 82 was applied onto the circumferential surface of the aforementioned cylindrical molded body and dried to form the layer to be the anode 82, thereafter the slurry for use in forming the electrolyte layer 83 was applied onto the layer to be the anode 82 and dried to form the layer to be the electrolyte layer 83. The laminated cylindrical body thus obtained was sintered by heating at 1300° C. for 2 hours in the air. In this way, on the circumferential surface of the support pipe 81 as a porous body, the anode 82 was formed as a porous body which was smaller in pore size than the support pipe 81, and the electrolyte layer 83 was formed on the surface of the anode 82. The pore size (diameter) of the porous body forming the support pipe 81 is set to be, for example, 5 to 10 µm, and the pore size of the porous body forming the anode 82 is set to be, for example, 1 µm or less.

Then, a slurry for use in forming the intermediate layer 84 was prepared by mixing together a particle material of ceria $((Gd_2O_3)_{0.1}(CeO_2)_{0.9})$ doped with gadorinia, an organic solvent and a binder ingredient. The slurry thus obtained was applied onto the circumferential surface of the aforementioned sintered body (over the electrolyte layer 83) and the newly formed layer was dried, and thereafter the layer was sintered by heating the cylindrical body thus treated at 1200° C. for 2 hours in the air.

Then, a slurry for use in forming the cathode 85 was prepared by mixing together a particle material composed of $La_{0.6}Sr_{0.4}CoO_3$, an organic solvent and a binder ingredient. The slurry thus obtained was applied onto the circumferential surface of the aforementioned sintered body (over the intermediate layer 84) and the newly formed layer was dried, and thereafter the layer was sintered by heating the cylindrical body thus treated at 1000° C. for 2 hours in the air.

Incidentally, in the present example, the support pipe 81 was 1.5 mm in thickness, 65 mm in length and 13 mm in outside diameter; and the anode 82 was 5 µm in thickness, the electrolyte layer 83 was 15 µm in thickness, the intermediate layer 84 was 5 µm in thickness, and the cathode 85 was 100 µm in thickness. Additionally, the intermediate layer 84 and the cathode 85 were also porous body having the pore size of the same order (1 µm in diameter) as that of the anode 82.

Figure 2:
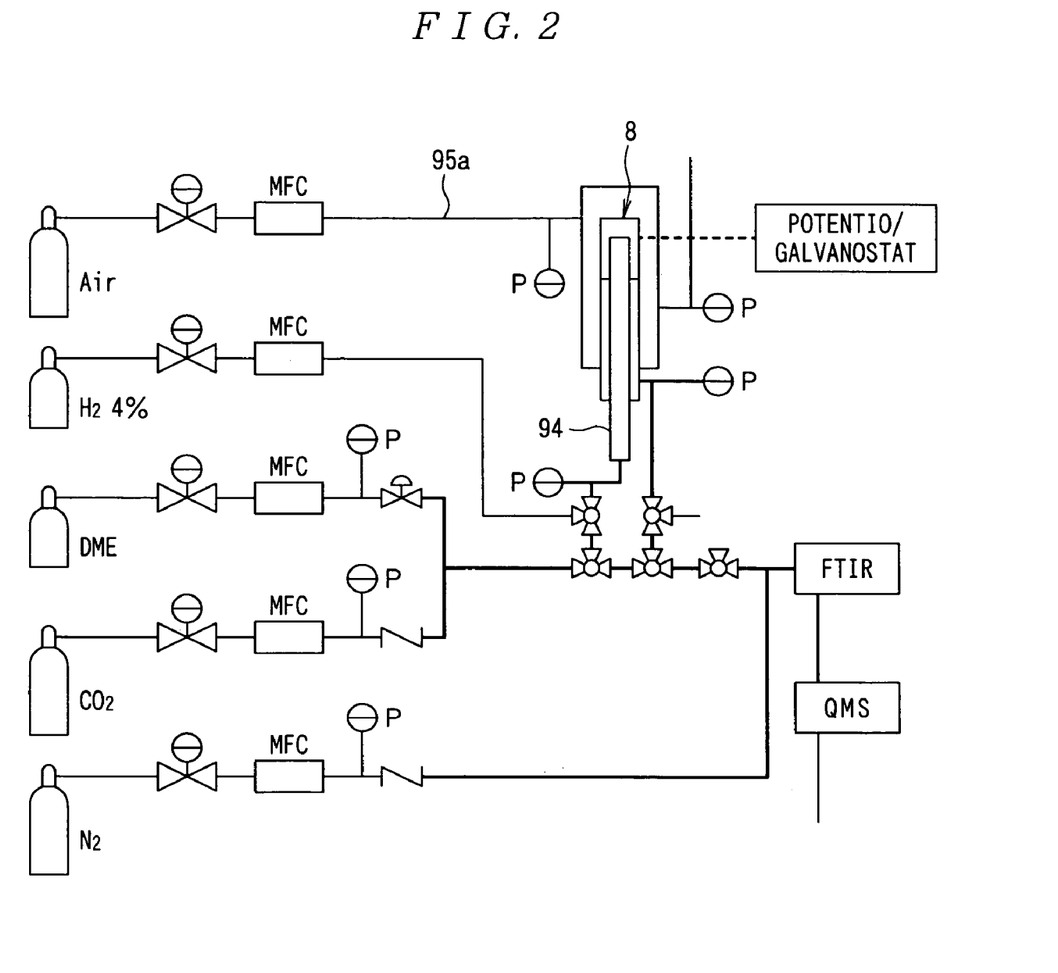
FIG. 2 is a diagram illustrating the experimental apparatus used in conducting the test for investigating the cell performance and the carbon deposition condition in the examples.

By use of the apparatus shown in FIG. 2 and under the condition such that the portion shown in FIG. 3 was maintained at 750° C., carbon dioxide and dimethyl ether were fed into the pipe 94 for introducing the fuel gas, and air was introduced into the cathode chamber 90 from the pipe 95a, and thus, the cell reaction was made to take place in the test cell 8. The flow rate of air was 200 (ml/min), the flow rate of dimethyl ether was 5 (ml/min), and the flow rate of carbon dioxide was varied to be 5, 7.5 and 10 (ml/min).

Additionally, the anode exhaust gas from the test cell 8 was diluted with nitrogen and then introduced into an analysis apparatus, the nitrogen flow rate being 2000 (ml/min). The pipes corresponding to the heavy line portions in FIG. 2 were heated to 150° C. for the purpose of preventing condensation of the gases inside the pipes. The electric current applied to the test cell 8 was regulated with a galvanostat, the cell voltage and the anode gas components were continuously measured, and thus, the stationary state values subsequent to the transient response were measured.

The cell performance was investigated for the case in which hydrogen and nitrogen were introduced with a ratio of 40 (ml/min):160 (ml/min) into the pipe 94 for introducing the fuel gas.

Figure 5:
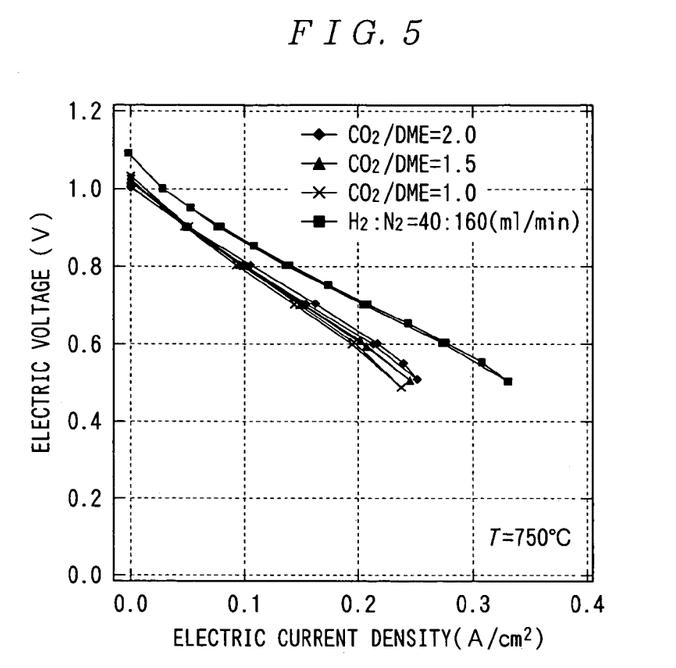
FIG. 5 is a graph showing the cell performance (the relation between the electric voltage and electric current density) obtained from the tests carried out in the examples.

FIG. 5 is a graph showing the cell performance (the relation between the electric voltage and the electric current density) obtained by the above described test. As can be seen from this graph, stable operation was possible up to a high fuel utilization ratio of 76% (the electric current density: 0.25 A/cm$^2$) for the cases in which the above described ratio was 1.5 and 2.0.

Figure 6:
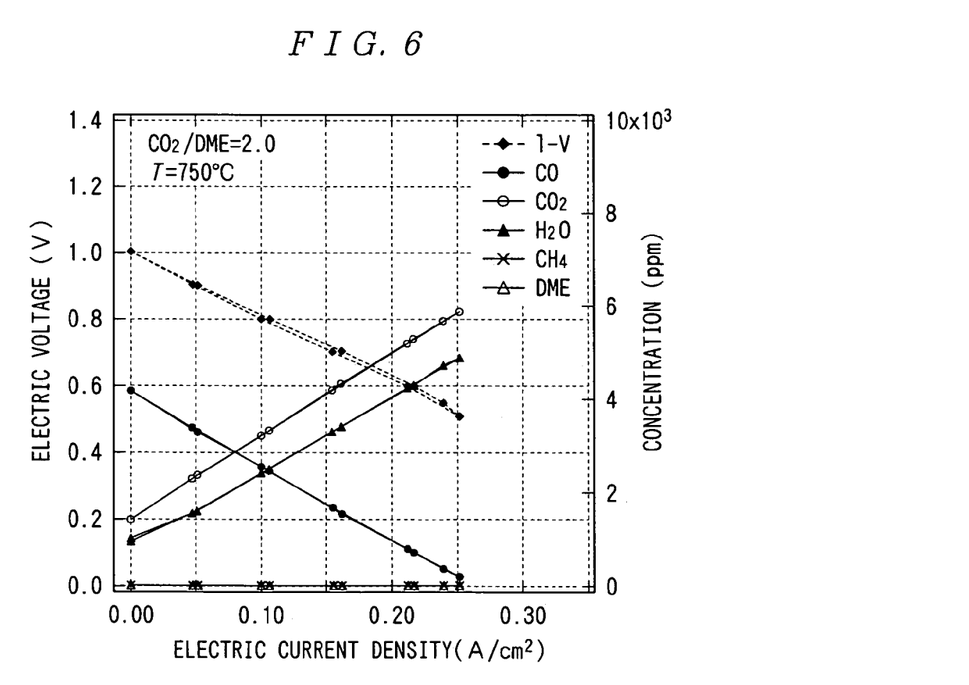
FIG. 6 is a graph showing the relation between the anode exhaust gas concentration and the electric current density and the relation between the electric voltage and the electric current density, in the case where the molar ratio of carbon dioxide to dimethyl ether is 2.0.

FIG. 6 is a graph showing the relation between the concentrations of the respective components in the anode exhaust gas and the electric current density for the case in which the above described ratio was 2.0. Additionally, this graph also shows the I-V line representing the relation between the electric voltage and the electric current density. From this graph, it can be found that dimethyl ether was completely decomposed and methane was not produced in the case in which the temperature was 750° C. and the molar ratio of carbon dioxide to dimethyl ether was 2.

Figure 7:
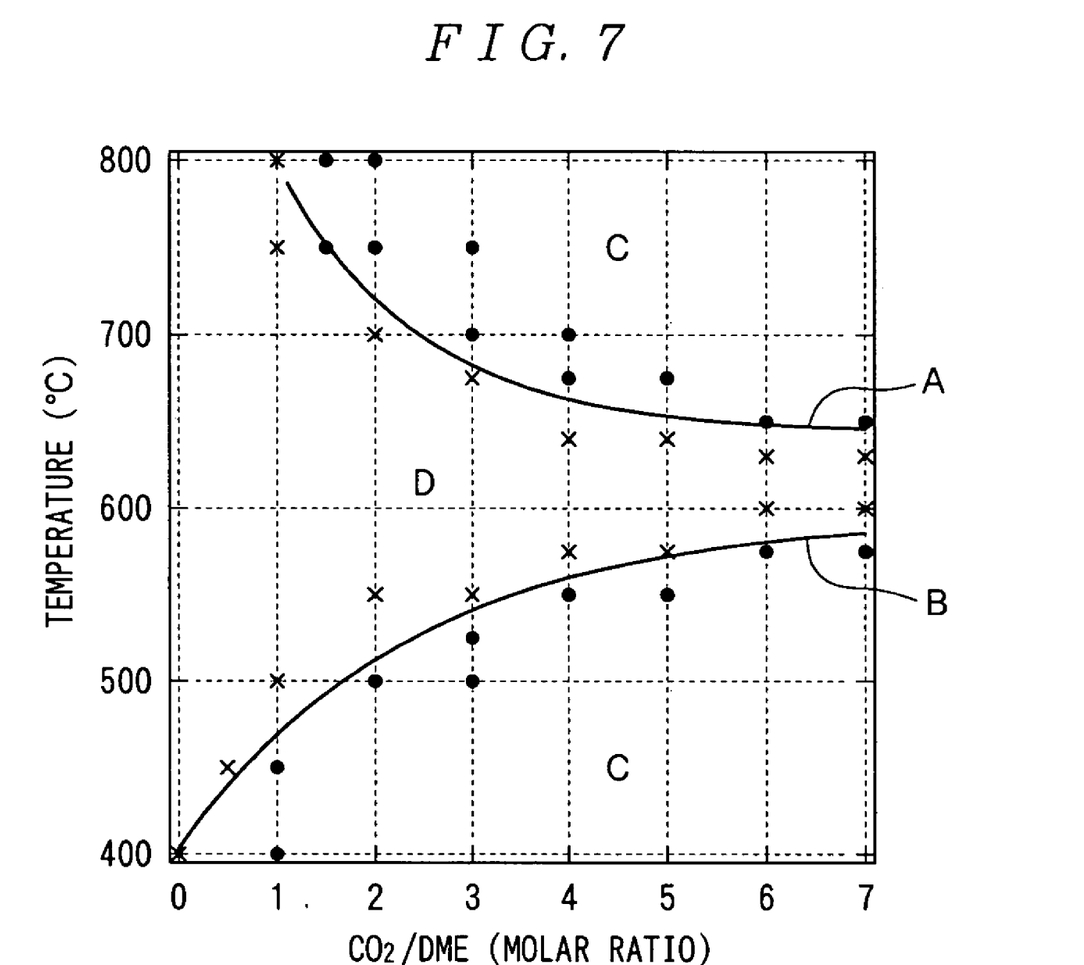
FIG. 7 is a graph showing the results of the investigation of the presence/absence of the carbon deposition accompanying the reaction between dimethyl ether and carbon dioxide, illustrated in terms of the relation between the molar ratio ($CO_2$/DME) of carbon dioxide to dimethyl ether and the reaction temperature.

In the next place, by use of the apparatus shown in FIG. 2, and by varying the temperature of the portion shown in FIG. 3 and by varying the molar ratio of carbon dioxide to dimethyl ether (CO$_2$/DME), there was made investigation as to whether carbon was deposited or not. FIG. 7 is the graph showing the results obtained in this investigation. In this graph, the curves A and B are the boundary curves separating the region having carbon deposition from the region having no carbon deposition; the region C represent the region where no carbon deposition occurred, and the region D represents the region where carbon deposition occurred. When the molar ratio of carbon dioxide to dimethyl ether is represented by R and the above described temperature is represented by T, the curve A is represented by the following formula (1') and the curve B is represented by the following formula (2'):

$$T=644+305 \cdot \exp(-0.69R) \quad (1')$$

$$T=597-194 \cdot \exp(-0.42R) \quad (2').$$

Consequently, by setting the temperature (T) and the molar ratio (R) so as to satisfy the following formula (1) or formula (2), the carbon deposition accompanying the reaction between dimethyl ether and carbon dioxide can be made not to occur:

$$T \geq 644+305 \cdot \exp(-0.69R) \quad (1)$$

$$T \leq 597-194 \cdot \exp(-0.42R) \quad (2).$$

What is claimed is:

1. A reforming apparatus for fuel cell comprising:
   a reforming reactor configured to reform dimethyl ether with carbon dioxide;
   an anode chamber; and
   a carbon dioxide gas feeding unit configured to feed carbon dioxide into the reforming reactor or the anode chamber when the fuel cell is activated, wherein the reforming reactor is further configured to receive any one of a discharged gas from the anode chamber or a mixed gas composed of the discharged gas and carbon dioxide from the carbon dioxide gas feeding unit when the fuel cell is operated in a stationary operation.

2. A fuel cell, comprising:
   an anode chamber;
   a cathode chamber; and
   a solid oxide, electrolyte wherein the anode chamber is configured to receive dimethyl ether and carbon dioxide from a carbon dioxide gas feeding unit or a discharge gas from a reforming reactor in which dimethyl ether is reformed with carbon dioxide when the fuel cell is activated, and configured to receive any one of an anode chamber discharged gas or a mixed gas composed of the anode chamber discharged gas and carbon dioxide directly or from the reforming reactor when the fuel cell is operated in a stationary operation.

3. The fuel cell according to claim 2, wherein the fuel cell is configured in such a way that at the time of shutdown or emergency shutdown, the carbon dioxide gas feeding unit is configured to introduce carbon dioxide as a purge gas into the reforming reactor and the anode chamber.

4. The reforming apparatus for fuel cell according to claim 1, wherein the carbon dioxide gas feeding unit is configured to introduce carbon dioxide as purge gas into the reforming reactor and the anode chamber at the time of shutdown or emergency shutdown.

5. The reforming apparatus for fuel cell according to claim 1, wherein the reforming reactor and the anode chamber are configured to react amounts of dimethyl ether and carbon dioxide at a particular temperature, wherein the particular temperature (T) and a molar ratio (R) of carbon dioxide to dimethyl ether satisfy the following formula (1) or formula (2):

$$T \geq 644+305 \cdot \exp(-0.69R) \quad (1)$$

$$T \leq 597-194 \cdot \exp(-0.42R) \quad (2).$$

6. The fuel cell according to claim 2, wherein the anode chamber is configured to react amounts of dimethyl ether and carbon dioxide at a particular temperature, wherein the particular temperature (T) and a molar ratio (R) of carbon dioxide to dimethyl ether satisfy the following formula (1) or formula (2):

$$T \geq 644+305 \cdot \exp(-0.69R) \quad (1)$$

$$T \leq 597-194 \cdot \exp(-0.42R) \quad (2).$$

7. An operation method of a fuel cell configured in such a way that the anode reaction of carbon monoxide as well as the anode reaction of hydrogen occurs, and either there is fed into the anode chamber a gas containing hydrogen and carbon monoxide generated by reacting dimethyl ether and carbon dioxide with each other in the reforming reactor, or there are fed in the anode chamber dimethyl ether and carbon dioxide without the intermediary of the reforming reactor, wherein:
   the feeding amounts of dimethyl ether and carbon dioxide and the temperature of said reforming reactor or the temperature inside said anode chamber are set in such a way that the molar ratio (R) of carbon dioxide to dimethyl ether and said temperature (T) satisfy the following formula (1) or formula (2):

$$T \geq 644+305 \cdot \exp(-0.69R) \quad (1)$$

$$T \leq 597-194 \cdot \exp(-0.42R) \quad (2).$$

8. The operation method of a fuel cell according to claim 7, wherein said fuel cell is a solid oxide fuel cell provided with a solid oxide as electrolyte.

9. The operation method of a fuel cell according to claim 7, wherein at the time of startup, carbon dioxide is fed from the carbon dioxide gas feeding unit into the reforming reactor or the anode chamber, and at the time of the stationary operation, the discharged gas from the anode chamber or a mixed gas composed of said discharged gas and carbon dioxide from the carbon dioxide gas feeding unit is fed into the reforming reactor or the anode chamber.

10. The operation method of a fuel cell according to claim 7, wherein at the time of shutdown or emergency shutdown, carbon dioxide is introduced as purge gas from the carbon dioxide gas feeding unit into the reforming reactor and the anode chamber.

11. The operation method of a fuel cell according to claim 8, wherein at the time of shutdown or emergency shutdown, carbon dioxide is introduced as purge gas from the carbon dioxide gas feeding unit into the reforming reactor and the anode chamber.

12. The operation method of a fuel cell according to claim 9, wherein at the time of shutdown or emergency shutdown, carbon dioxide is introduced as purge gas from the carbon dioxide gas feeding unit into the reforming reactor and the anode chamber.

\* \* \* \* \*